United States Patent [19]

Alpatiev et al.

[11] Patent Number: 4,743,732
[45] Date of Patent: May 10, 1988

[54] METHOD OF ELECTRIC-ARC CONDENSER-DISCHARGE PERCUSSION STUD WELDING

[75] Inventors: Jury S. Alpatiev; David M. Kaleko; Georgy F. Kolesnik; Nikolai N. Oseledko; Natalia A. Chvertko, all of Kiev, U.S.S.R.

[73] Assignee: Institute Electrosvarki Im. Eo Patona, Kiev, U.S.S.R.

[21] Appl. No.: 47,871

[22] Filed: May 6, 1987

[51] Int. Cl.$^4$ ................................................ B23K 9/20
[52] U.S. Cl. .................................... 219/99; 219/130.31
[58] Field of Search ........................ 219/98, 99, 130.31

[56] References Cited

U.S. PATENT DOCUMENTS 4,417,120  11/1983  Lumbra et al. ........................ 219/98

FOREIGN PATENT DOCUMENTS 2118878  7/1983  United Kingdom .................. 219/98
941052  11/1980  U.S.S.R. .

OTHER PUBLICATIONS

"Avtomaticheskaya Svarka", Magazine, No. 9, 1973, Naukova Dumka/Kiev/, N. A. Chvertko, Udarnaya Kondensatornaya Svarka Shpilek I Shtiftov, pp. 51–53.
Thysen Technische Berichte, No. 2, 1982, A. Frings et al., "Lichtbogenbolzenschweissen and Kaltgewalzten Stahlfeinblechen", pp. 161–170.

Primary Examiner—Clifford C. Shaw
Attorney, Agent, or Firm—Lilling & Greenspan

[57] ABSTRACT

The method of electric-arc condenser-discharge percussion stud welding includes prepositioning a stud on an article, retracting the stud from the article while igniting an auxiliary arc between them, and moving the stud towards the article. While the stud is thus moved, the voltage drop across the auxiliary electric arc is measured, and from the value thus measured is subtracted the sum of electrode-adjoining voltage drops at the end of the stud and at the article, and when the voltage drop value thus obtained varies by 10 to 90 percent from the initially obtained value of the voltage drop, the discharge of the condenser is initiated. Then the stud is introduced into the molten metal of the article, and the end of the stud is butted with the article to form a welded joint.

1 Claim, 1 Drawing Sheet

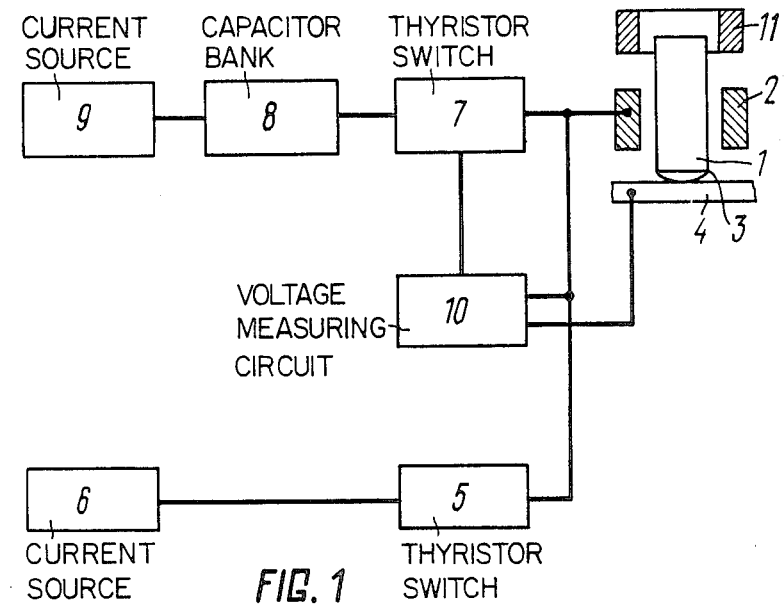
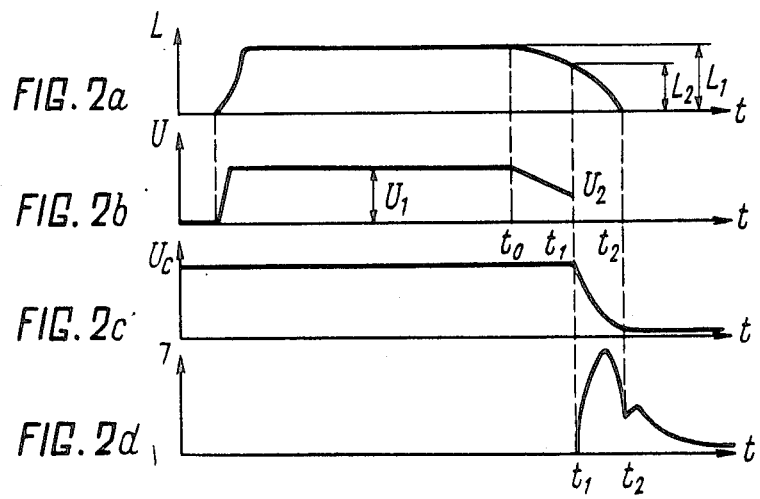

METHOD OF ELECTRIC-ARC CONDENSER-DISCHARGE PERCUSSION STUD WELDING

BACKGROUND OF THE INVENTION

1. Field of the Invention

The present invention relates to electric arc welding, and more particularly it relates to methods of electric-arc condenser-discharge percussion stud welding, which are also called the Vang welding methods.

The disclosed method of electric-arc condenser-discharge percussion stud welding can be employed for production of welded structures in general engineering, ship-building, instrument-making and civil engineering.

2. Description of the Prior Art

There is widely known a method of electric-arc condenser-discharge percussion welding of studs to metal sheets, plate and other articles ("Avtomaticheskaya svarka" Magazine, No. 9, 1973, "Naukova Dumka /Kiev/, N.A. Chvertko, "Udarnaya kondensatornaya svarka shpilek i shtiftov", pp. 51–53), according to which, in order to ensure reliable ignition of an electric arc between the end of a stud and the article, a projection is formed on the end of the stud by cold upsetting, the length and diameter of this projection being determined by the main diameter of the stud and material of the parts to be welded. The projection on the end of the stud to be welded is shaped as a wedge, as a cone or otherwise. A spring mechanism is operated to set the projection of the stud upon the surface of the article. A bank of welding condensers (capacitors) precharged to a required voltage value is electrically connected to the stud and to the article, so that the welding current starts flowing through the projection of the stud and the article. When the value of the discharge current of the condenser bank reaches its peak, the projection becomes explosion-like evaporated by the high current density (to $10^6$ A/cm$^2$) in the projection. Owing to the high temperature of metal vapors, the gap across the stud and the article is ionized, and an electric arc is ignited, the arcing taking place in the vapors of the stud and article being welded. The length of the electric arc and its arcing time depend on the length and diameter of the projection of the stud. The end of the stud and the surface of the article underlying it are fused. The action of the spring mechanism brings the end of the stud closer to the article, so that the length of the electric arc gradually diminishes, and when the end of the stud is introduced into the molten metal of the article, the electric arc is extinguished. When the molten metal completely hardens, the welding cycle is completed.

The formation of a projection on the end of a stud is a relatively complicated operation, as comparatively high precision of the length and diameter of the projection is essential for proper repetition of the operation of making quality welded joints.

There is also widely known a method of automatic arc welding of a curvilinear butt joint of a variable width in a V-groove with a consumable electrode (SU, A, 941052). The method is that of gas-shielded d.c. welding. First, an electric arc is ignited between the electrode and the welded structure. With the arc ignited, the electrode is moved along the weld, while being simultaneously oscillated across the weld. In the course of the welding the voltage of the welding arc is measured red, and when the value measured decreases by 10–20% from the predetermined value and this variation lasts for 0.025–0.1 s, owing to the variation of the length of the arc gap as the electrode approaches the edge of the structure being welded, the motion of the electrode is reversed. As a result, the electrode is guided along the weld with sufficient accuracy, and the variable-width groove of the welded structure is uniformly filled with metal across its width. As each successive bead is applied (the welding operation being conducted in several passes), the rate of the welding is automatically varied.

The reversing of the motion of the electrode following the varying voltage of the electric arc is feasible only when the voltage varies within a 10% to 20% range, because if the voltage of the electric arc decreases by a greater value, the welding duty is adversely affected. The 0.025–0.1 s lag in sending the command for reversing the motion of the electrode slows down the process.

There is further widely known a method of electric-arc condenser-discharge percussion stud welding (Thyssen Technische Berichte, No. 2, 1982, A. Frings et al., "Lichtbogenbolzenschweissen and Kaltgewalzten Stahlfeinblechen", pp. 161–170), including prepositioning a stud on an article, retracting the stud to be welded from the article while igniting an auxiliary electric arc between them, and moving the stud towards the article by the spring mechanism of the welding head. After the predetermined time of arcing of the auxiliary arc, a discharge of a capacitor or condenser bank is initiated, so that the welding current flows through the stud to be welded and the article, fusing the end surface of the stud and the underlying surface of the article. Upon the preset time of arcing of the welding electric arc the stud is introduced into the molten metal of the article. Then the stud to be welded and the article are held together or butted to form a welded joint. In this process, the setting of the stud to the topmost, retracted position requires the use of special-design gauges of high precision, as the timing of the discharge of the condenser bank is determined by the time of the motion of the stud relative to the article.

However, the process would not ensure adequate repetition of the operation of butting the stud and the article, caused by insufficiently stable conditions of the performance of the spring mechanism of the welding head. A varying diameter of studs would vary the mass of the spring mechanism, requiring an adjustment of the resilience of the spring mechanism of the welding head.

This object is attained in a method of electric-arc condenser-discharge percussion stud welding, including prepositioning a stud on an article, retracting the stud from the article while igniting an auxiliary arc between the end of the stud and the article, moving the stud towards the article, discharging a condenser across the end of the stud and the article, introducing the stud into the molten metal of the article, and butting the end of the stud and the article to form a weld, in which method, in accordance with the present invention, while moving the stud towards the article, the voltage drop across the auxiliary electric arc is measured, and from the value thus measured is subtracted the sum of the electrode-adjoining voltage drops at the end of the stud and at the article, and the discharge of the condenser is initiated when the voltage drop value thus obtained varies by 10% to 90% from the initially obtained voltage drop value.

The herein disclosed method of electric-arc condenser-discharge percussion stud welding provides for enhancing the efficiency factor of the welding operation by prolonging the arcing time of the welding electric arc, which permits to extend the range of weldable studs.

BRIEF DESCRIPTION OF THE DRAWINGS

The invention will be further described in connection with its embodiment in a process of electric-arc condenser-discharge percussion stud welding, with reference being made to the accompanying drawings, wherein:

FIG. 1 is a block-unit circuit diagram of an apparatus capable of performing a method of electric-arc condenser-discharge percussion stud welding embodying the invention; and FIGS. 2a, 2b, 2c and 2d are time-related charts, respectively, of the motion of the stud relative to the article, of the voltage across the auxiliary arc column, of the condenser voltage and of the welding arc current in a method embodying the present invention.

DESCRIPTION OF THE PREFERRED EMBODIMENT

The method of electric-arc condenser-discharge percussion stud welding is performed, as follows.

A stud 1 (FIG. 1) held by a gripper 2 of a welding head (not shown) is prepositioned by its end 3 on an article 4.

An electric current is fed to ignite an auxiliary electric arc through a series connection of a thyristor switch 5 and a current source 6. For feeding an electric current for igniting the welding arc, there is provided a series connection of a thyristor switch 7, a condenser (capacitor) bank 8 and a current source 9. Connected in parallel with the gap across the end 3 of the stud 1 and the article 4 is a voltage measuring circuit 10 connected with the thyristor switches 5 and 7.

The thyristor switch 5 connected with the current source 6 is turned on. The stud 1 is retracted from the article 4 by the electromagnet 11 of the welding head, and an auxiliary electric arc is ignited between the end 3 of the stud 1 and the article 4.

The auxiliary electric arc ionizes the arc gap between the end 3 of the stud 1 and the article 4. As the stud 1 is fully retracted from the article 4, the electromagnet 11 is deenergized, and the spring mechanism (not shown) of the welding head moves the stud 1 towards the article 4 (FIGS. 1 and 2a) with the auxiliary arc arcing.

As the stud is moved towards the article 4 from the moment $t_o$, the voltage drop across the auxiliary electric arc is measured, and from the value thus measured is subtracted the sum of the electrode-adjoining voltage drops at the end 3 of the stud 1 and at the article 4, obtaining the value corresponding to the voltage drop $U_1$ (FIG. 2b) of the column of the auxiliary electric arc, this value being directly proportional to the length of the auxiliary arc, i.e. to the length $L_1$ (FIG. 2a) equalling the distance between the end 3 of the stud 1 and the article 4, and when this value reaches the predetermined voltage drop $U_2$ corresponding to a distance $L_2$ between the end 3 of the stud 1 and the article 4, the distance of the condenser bank 8 (FIG. 1) is initiated.

The predetermined voltage drop $U_2$ is selected to correspond to the charging voltage of the condenser bank 8, the diameter of the stud 1 to be welded, the inductance of the power cable (not shown) connecting the source 9 of the welding current through the condenser bank 8 to the welding head (not shown).

The distance $L_1$ is determined by the relative value of the decrease of the voltage drop $U_1$ (FIG. 2b) across the column of the auxiliary electric arc, measured by the voltage measuring circuit 10. As the decrease of the voltage $U_1$ reaches the value $U_2$ (moment $t_1$) proportional to the length $L_2$, the voltage measuring circuit 10 sends a signal to turn on the thyristor switch 7 connected with the condenser bank 8. The condenser bank 8 precharged from the current source 9 discharges across the gap between the end 3 of the stud 1 and the article 4, ionized in advance by the auxiliary electric arc (FIG. 2c). The welding electric arc is thus maintained by the current of the discharge of the condenser bank 8 (FIG. 2d). The surfaces of the end 3 of the stud 1 and of the article 4 to be welded become fused by this current, and at the moment $t_2$ when the pressure of the metal vapors in the arc becomes lower than the effort of the spring (not shown) of the spring mechanism (not shown, either) of the welding head, the stud 1 enters the molten metal of the article 4, and in this way the stud 1 to be welded and the article 4 are butted. The welding arc becomes extinguished, and a weld is formed between the end 3 of the stud 1 and the article 4. The discharge current of the condenser bank 8 flowing through the welded joint of the end 3 of the stud 1 with the article 4 drops exponentially. When the metal of the weld hardens, the welding cycle is completed.

When the method of the present invention is performed, the distance from the end 3 of the stud 1 to the article 4 is measured from the relative decreasing of the voltage drop across the column of the auxiliary electric arc, the last-mentioned arc being thus employed as an independent measurement tool.

The arcing voltage can be determined from Ireton's formula:

$$U_3 = a + bL, \tag{1}$$

where

"a" is the sum of the electrode-adjoining drops of voltage, i.e. the sum of the anode and cathode drops of voltage at the end 3 of the stud 1 and at the article 4, which is practically independent of the length of the electric arc (the absolute value of the electrode-adjoining voltage drops is 10 ... 17 V);

"b" is a proportionality factor depending on the external conditions, the welding current value and the length of the electric arc (N. A. Kaptsov, "Elektricheskie yavleniya v gazakh i v vakuume", 1950, Gosudarstvennoye Izdatel'stvo Tekhnicheskoi i Teoreticheskoi Literatury (Moscow-Leningrad), p. 524.).

If the welding current is turned on the moment the voltage across the auxiliary electric arc attains the predetermined value $U_4$, the length of the arc gap, i.e. the distance from the end 3 of the stud 1 to the article 4 equals:

$$L_2 = (U_4 - a)/b, \tag{2}$$

$$\text{with } U_4 = kU_o, \text{ and} \tag{3}$$

$$k = U_4/U_o, \tag{4}$$

where $U_o$ is the voltage drop across the electric arc corresponding to the maximum retracted distance of the stud 1 from the article 4.

By supplementing (1) in (3):

$$U_4 = k(bL_o + a), \quad (5)$$

where $L_o$ is the length of the electric arc with the stud 1 at the maximum distance from the article 4.

By supplementing (5) in (2):

$$L_2 = \frac{U_4 - a}{b} = kL_o - \frac{(1-k)a}{b}. \quad (6)$$

The value of the voltage drop across the column of the auxiliary electric arc equals:

$$U_1 = U_3 - a = bL.$$

Then, $$k = U_2/U_1 = bL_1/bL_o = L_1/L_o; \; L_1 = kL_o \quad (7)$$

where $U_1$ is the voltage drop across the column of the electric arc, corresponding to the maximum distance of the stud 1 from the article 4, in its fully retracted position;

$U_2$ is the voltage drop across the column of the electric arc at which the welding current of the condenser discharge is turned on.

It can be clearly seen from (7) that when the value of the voltage drop across the electric arc is measured as the stud 1 is moved towards the article 4, the sum of the electrode-adjoining voltage drops is subtracted from the value thus measured, and the value thus obtained is compared with a predetermined voltage drop value, the dependence of these values on external factors is compensated for.

The moment of turning on the welding current supplied by the discharge of the condenser bank 8 should be so timed that upon the engagement of the end 3 of the stud 1 with the article 4 their respective surfaces should be completely fused over. If the discharge of the condenser bank 8 is initiated somewhat too late, the welded parts would not have enough time for completely fusing over, and the quality of the welded joint would be poor. Moreover, in this case some of the energy stored by the condenser bank 8 is wasted on short-circuiting upon the engagement of the end 3 of the stud 1 with the article 4. On the other hand, if the discharge of the condenser bank 8 is initiated somewhat too early, the engagement of the end 3 of the stud 1 with the surface of the article 4 would take place at a moment when the welding current flowing through them is insufficient for maintaining them in a fused state, and the welded joint quality would be likewise poor.

The level of the voltage drop across the column of the auxiliary electric arc at which the turning on of the welding current supplied by the discharge of the condenser bank 8 should take place is within a range from 10% to 90% of the initially measured voltage at the maximum retraction of the stud 1 from the article 4, which practically provides for turning the welding current on at any distance therebetween, at any moment of the motion of the stud 1 towards the article 4. The voltage drop across the auxiliary electric arc which is d.c. supplied may vary within 16 V to 40 V. The lower limit of this range, as it can be seen, is close to the sum of the voltage drops at the electrodes, i.e. at the end 3 of the stud 1 and at the article 4, which equals 10 V to 17 V. The variation of the voltage drop across the column of the auxiliary arc, at which the welding current is turned on, should not be less than 10% of the initial value, as this would bring about the hazard of a shorting of the gap between the end 3 of the stud 1 and the article 4, without the welding arc being ignited. On the other hand, the upper limit of the variation of the voltage drop of the auxiliary arc at which the welding current is turned on, set as 90% of the initial value, is defined by the maximum advisable time of the arcing of the welding arc which depends on the maximum length of the welding electric arc at which it can be reliably ignited and burns also stably and reliably. In practice, the maximum length of the auxiliary electric arc is 3–5 mm. The maximum arcing time of the welding current depends on the inductance of the welding circuit including the power supply cable and amounts to 6–8 ms.

TABLE

| No. | Stud dia., mm | Stud material | Article thickness, mm | Article material | Voltage across column of auxiliary electric arc at maximum spacing of stud an article, V | Voltage across column of auxiliary arc at which condenser discharge is initiated, V | Variation level, % | Supply cable length, m | Energy input in welding cycle, J |
|---|---|---|---|---|---|---|---|---|---|
| 1 | 3 | Low-carbon steel | 3 | Low-carbon steel | 40 | 4 | 10 | 20 | 480 |
| 2 | 8 | Low-carbon steel | " | Low-carbon steel | " | 20 | 50 | " | 3100 |
| 3 | 10 | Low-carbon steel | " | Low-carbon steel | " | 36 | 90 | " | 3920 |

What is claimed is:

1. A method of electric-arc condenser-discharge percussion stud welding, comprising the steps of:

prepositioning a stud to be welded on an article;

retracting the stud from the article, while igniting an auxiliary electric arc between the end of the stud and the article;

moving the stud towards the article;

while moving the stud towards the article, measuring the voltage drop across the auxiliary electric arc, measuring the sum of the electrode voltage drops at the end of the stud and at the article, and determining the difference between these two values, and subtracting from the value of the voltage drop across the auxiliary electric arc the sum of the electrode-adjoining voltage drops at the end of the stud and at the aticle;

initiating the discharge of a welding current supply condenser means when the value of said difference varies in an amount equal to 10 to 90 percent of its initially obtained value;

introducing the stud to be welded into the molten metal of the article; and butting the end of the stud to be welded and the article to form a welded joint.

* * * * *